United States Patent [19]

Winstead

[11] 4,436,679
[45] Mar. 13, 1984

[54] METHOD AND APPARATUS FOR GENERATING FOAMED THERMOPLASTIC MATERIALS

[75] Inventor: Thomas W. Winstead, Baltimore, Md.

[73] Assignee: Maryland Cup Corporation, Owings Mills, Md.

[21] Appl. No.: 319,403

[22] Filed: Nov. 9, 1981

[51] Int. Cl.³ .................................................. B29D 27/00
[52] U.S. Cl. .................................... 264/40.3; 264/40.6; 264/40.7; 264/50; 264/53; 264/54; 264/DIG. 5; 425/4 C; 425/144; 425/145; 425/817 C
[58] Field of Search .................... 264/50, 53, 51, 54, 264/DIG. 5, 40.3, 40.6, 40.7; 425/4 C, 144, 145, 817 C

[56] References Cited
U.S. PATENT DOCUMENTS

| | | | |
|---|---|---|---|
| 3,089,857 | 5/1963 | Pottenger | 264/53 X |
| 3,439,622 | 4/1969 | Welty et al. | |
| 3,482,006 | 12/1969 | Carlson, Jr. | |
| 3,711,067 | 1/1973 | Kovacs | 264/53 X |
| 3,785,620 | 1/1974 | Huber | |
| 3,792,839 | 2/1974 | Gidge | 264/53 X |
| 3,796,779 | 3/1974 | Greenberg | 264/50 |
| 3,830,901 | 8/1974 | Winstead | |
| 3,830,901 | 8/1974 | Winstead | 264/51 |
| 3,871,624 | 3/1975 | Huber et al. | |
| 3,940,467 | 2/1976 | Brachman | 264/53 X |
| 3,981,649 | 9/1976 | Shimano et al. | |
| 4,120,923 | 10/1978 | Kloker et al. | 264/50 X |
| 4,132,838 | 1/1979 | Kreuer et al. | |
| 4,211,523 | 7/1980 | Hunerberg | 264/50 X |
| 4,302,409 | 11/1981 | Miller et al. | 264/50 X |
| 4,333,898 | 6/1982 | Schmidtchen | 264/50 X |

FOREIGN PATENT DOCUMENTS

| | | |
|---|---|---|
| 241099 | 7/1965 | Australia. |
| 1704824 | 5/1971 | Fed. Rep. of Germany. |
| 2501966 | 7/1975 | Fed. Rep. of Germany. |
| 2544559 | 4/1977 | Fed. Rep. of Germany. |

OTHER PUBLICATIONS

W. Allerdisse "Messen, Regeln und Steuern an Spritzgiessmaschinen" *Regelungstechnische Praxis*, vol. 17, Heft 9, pp. 266–273 (1975).

*Primary Examiner*—Philip E. Anderson
*Attorney, Agent, or Firm*—Birch, Stewart, Kolasch & Birch

[57] ABSTRACT

A method and apparatus for entraining gas as a blowing agent in a thermoplastic melt to provide a foamed thermoplastic extrudate wherein an annular sheet-like flow of gas under pressure is impinged on a tubular configuration of melt to entrain the gas in the melt is disclosed. Also disclosed is an improved method and apparatus for controlling the pressure in the thermoplastic melt.

49 Claims, 17 Drawing Figures

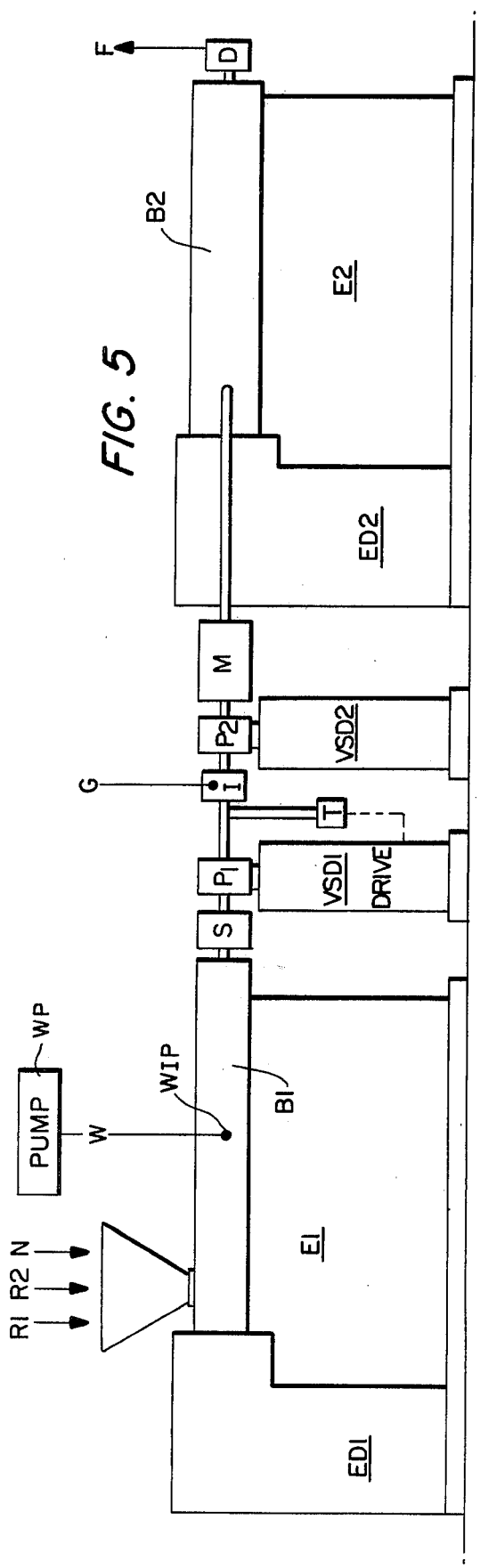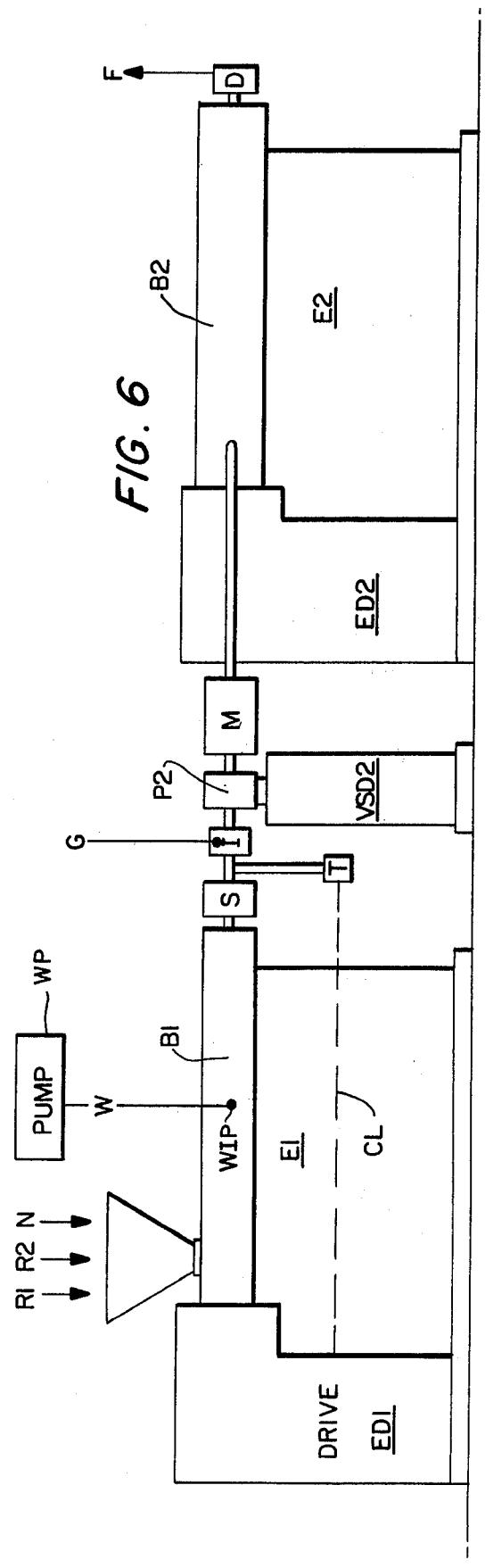

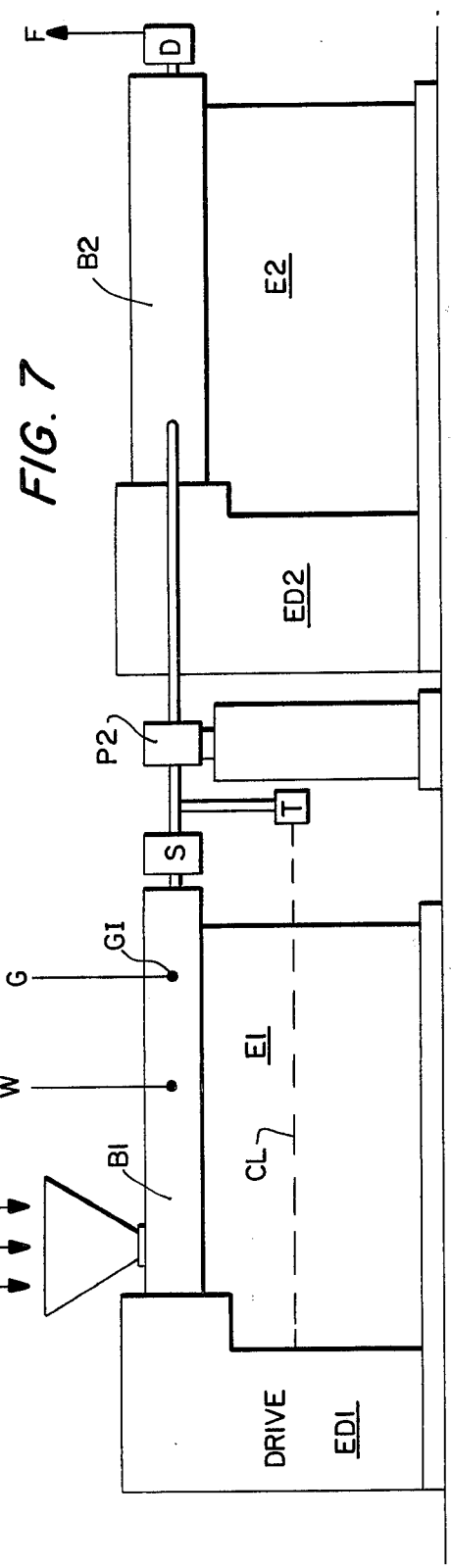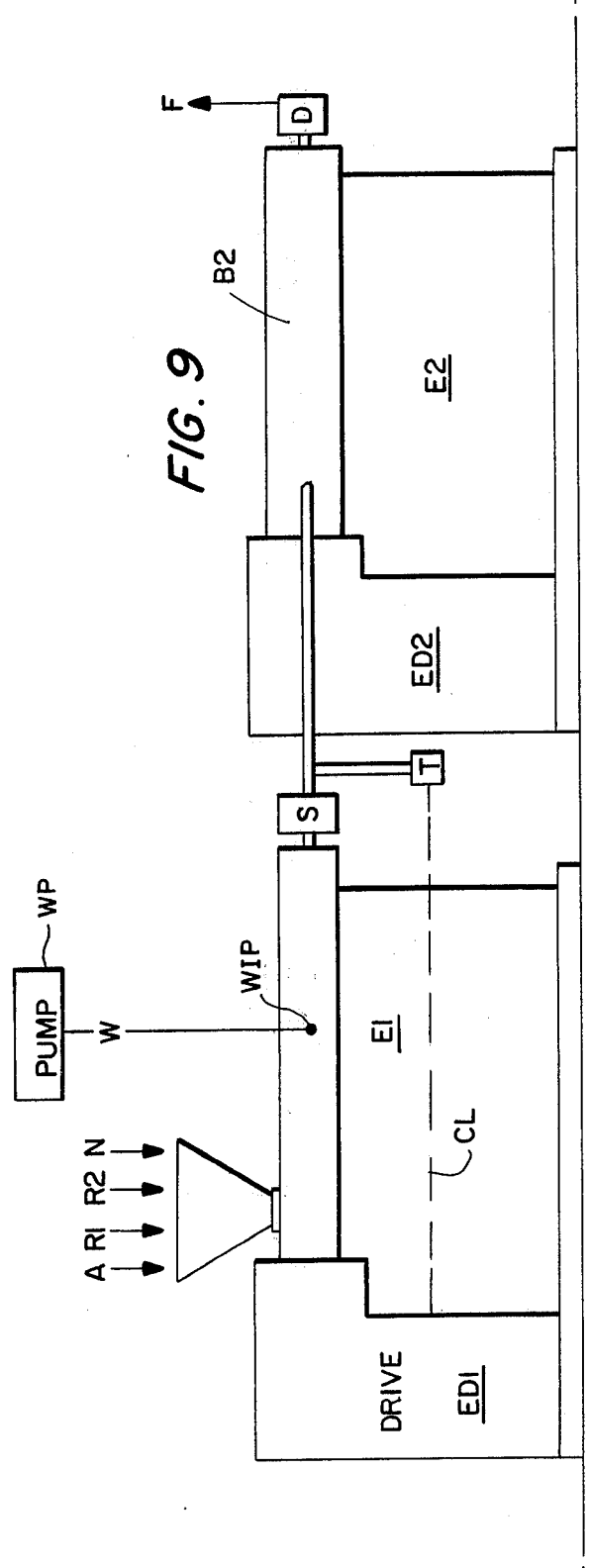

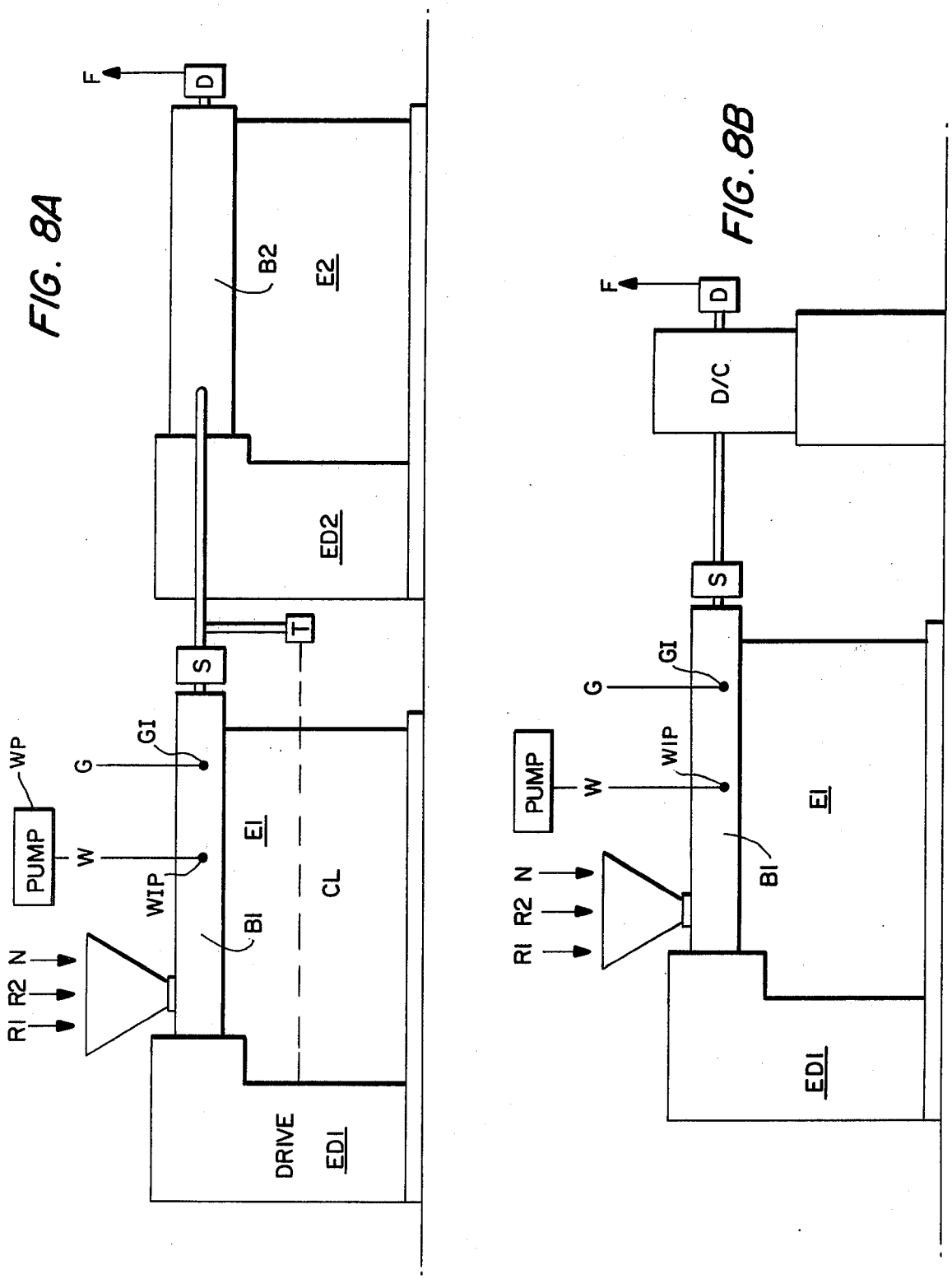

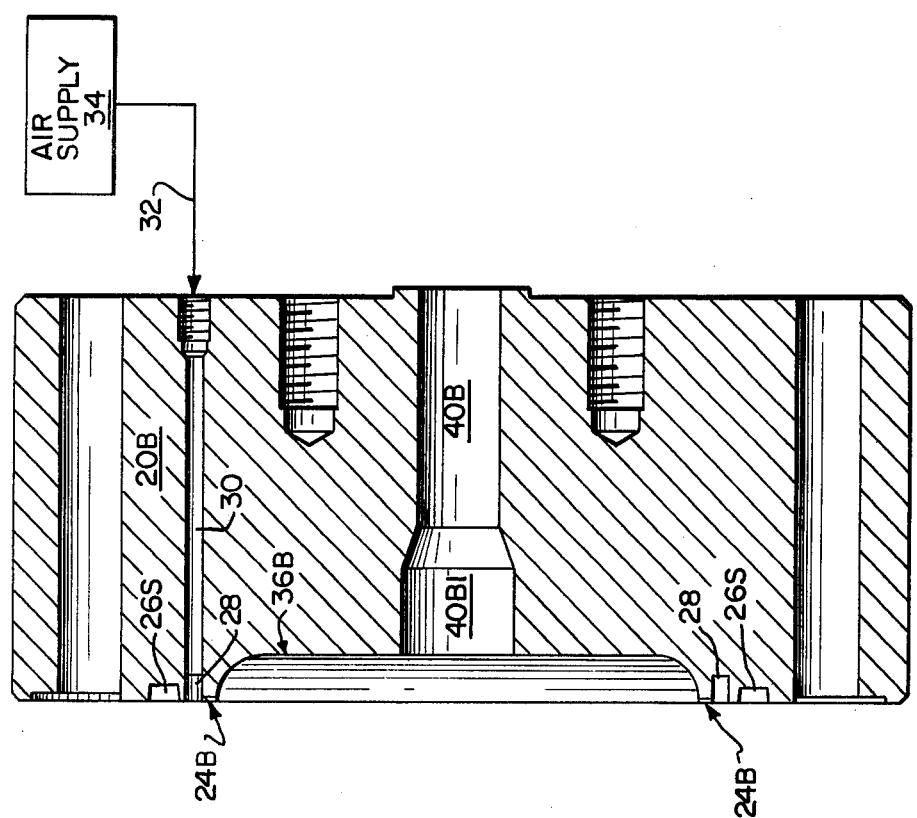
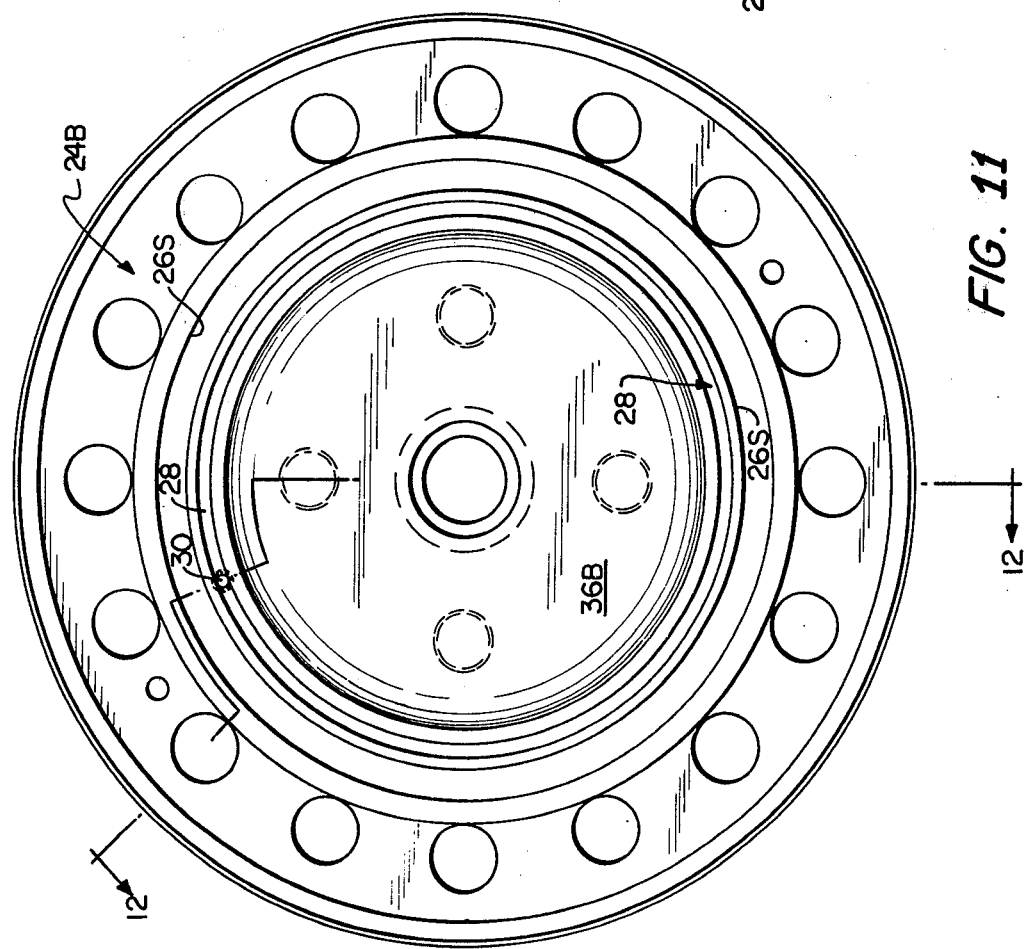
FIG. 12
FIG. 11

METHOD AND APPARATUS FOR GENERATING FOAMED THERMOPLASTIC MATERIALS

FIELD OF THE INVENTION

This invention relates to the generation of foam thermoplastic materials in the form of extrudates and more particularly, to the generation of foamed thermoplastic extrudates utilizing blowing agents other than fluorocarbons and specifically, air, nitrogen, carbon dioxide, and water either alone or in combination with themselves and other ingredients.

BACKGROUND OF THE INVENTION

The predominate blowing agent for the generation of thermoplastic foam extrudates on a commercial basis has been fluorocarbons, for example, trichlorofluoromethane and dichlorofluoromethane. As a result of ecological studies, fluorocarbons have been determined to be an undesirable pollutant for the atmosphere. Accordingly, ways are being sought to eliminate or materially reduce the utilization of fluorocarbons for all purposes wherever possible. A significant area in which to eliminate fluorocarbons from manufacturing processes is in the generation of thermoplastic foam extrudates such as thermoplastic foam sheeting and the like.

In the process of eliminating fluorocarbons, it becomes apparent that if chemical blowing agents can also be successfully eliminated and only harmless ingredients utilized as the blowing agents, then the manufacturing processes for foamed thermoplastic extrudates would become more ecologically sound.

Natural gases such as air, pure nitrogen or pure carbon dioxide, all of which have predictable and acceptable effects on the ecology, would be the most desirable blowing agents. In addition to these gases, water, since it would become vaporized in contact with molten thermoplastic masses in an extruding line or the like, is also a prime candidate for an ecologically sound blowing agent.

It is therefore an object of the invention to supplant Freon as a blowing agent for foamed thermoplastic extrudates and the like.

Another object of the present invention is to provide a new and novel method and apparatus for injecting air, nitrogen, carbon dioxide, water and/or combinations of these into an extrusion system configuration as blowing agents to produce foamed thermoplastic extrudate from that extrusion system.

Another object of the present invention is to reduce the cost of producing foamed thermoplastic extrudates.

Still another object of the present invention is to provide foamed thermoplastic extrudates of enhanced quality.

Yet another object of the present invention is to provide a new and novel combination of gases and/or water and/or other ingredients as the blowing and nucleating agents for the production of foamed thermoplastic extrudates and the like, thereby totally supplanting and eliminating the need for fluorocarbons in the production of such products.

These and other objects of the present invention will become more fully apparent with reference to the following specification and drawings which relate to several preferred embodiments of the invention.

SUMMARY OF THE INVENTION

The methods of the present invention include the controlled injection of gases such as air, nitrogen and carbon dioxide and/or water and/or nucleating agents such as talc into an extrusion system upstream of the extruding die. Some embodiments also include the addition of chemical blowing agents which further illustrate the versatility of the methods of the present invention.

Basically, the extruder systems contemplated by the present invention are of either a single extruder or a tandem extruder configuration with various access points at which controlled amounts of thermoplastic, nucleating agents, gas, water and/or chemical blowing agents can be added to the molten thermoplastic mass being produced by the extrusion system upstream of the extruding die.

In a preferred single extruder embodiment of the present invention, resin, granulates and a nucleating agent are introduced into the upstream end of an extruder and a controlled volume of water is introduced mid-way between the upstream end and the gate of the extruder valve. The output of the extruder then passes through a screen changer and a gear pump, in that order, through a gas injector assembly, then through a mixer (of either the static or dynamic type) and a dynamic cooler structure to an extruding die. The final foamed product emanates from the extruding die. Upstream from the mixer at the gas injector assembly, a transducer is provided to maintain the proper relationship between the speed of the pump and the pressure at the gas injection assembly to maintain a constant pressure at the point of gas injection into the system. This insures a substantially uniform flow of compressible gas into the molten extrudate upstream of the mixer and cooler assemblies to ensure a homogeneous product. The water injected into the extruder barrel is accomplished by use of a metering pump or the like.

In the case of the preferred embodiment of the tandem extrusion system, the first extruder is provided with resin, granulates and nucleator at its upstream end, with water injection intermediate the ends of its barrel, and the output of the first extruder passes through a screen changer and a first gear pump. This first gear pump has its speed controlled by a transducer immediately adjacent the gas injection apparatus which is at the output of the first gear pump. Downstream and immediately adjacent the outlet end of the gas injection apparatus is a second gear pump which then feeds a mixer, the latter exhausting into the upstream end of a second extruder barrel which serves as a dynamic cooling device to bring the foamed plastic extrudate to the proper temperature and consistency to be emitted from the downstream extruding die which is at the gate of the second extruder. In this case, the first and second gear pumps are provided to prevent the compressible plastic material from assuming too many variations in actual system pressure on both sides of the point of injection of gas into the molten extrudate.

In all of the embodiments of the present invention it is very important that the flow of water at the injection point into the extruder be uniform. The more uniform the flow of water at the injection point, the better the downstream mixing of gas after injection of the gas into the molten extrudate. The combination of uniform flow of water and a consistent pressure at the injection point of the gas into the molten extrudate to insure uniform gas flow is essential to product quality. This uniformity of gas flow is accomplished by maintaining a constant pressure differential between the source of gas and the melt flow through the gas injector apparatus.

With regard to the gas injection apparatus, the basic design of this apparatus is an attempt to approximate molecule for molecule injection to minimize or substantially eliminate downstream mixing. However, because of limitations of a mechanical nature regarding unduly high pressures as gaseous injection stream sizes are reduced in an effort to approach molecule for molecule mixing, a practical compromise is embodied in the structure of the gas injector apparatus of the present invention in an effort to achieve optimum injection levels which when combined with a downstream mixer device will achieve substantially the same results as molecule for molecule injection.

The gas injector assembly consists of an in-line body having a central bore with an expanded substantially cylindrical central chamber defined therein in which a flow spreader is positioned having sufficient conformality with the expanded chamber to spread the flow of incoming molten extrudate into a circular fan shape and pass it through a close tolerance annular gap between the spreader and the walls of the chamber. At the downstream side of this annular gap a very small annular slot is provided in the peripheral wall of the expanded cylindrical cavity which slot is supplied with gas under pressure and causes a thin sheet of gas to be introduced into the thin sheet of thermoplastic extrudate flowing around the flow spreader at that point. Immediately subsequent to this injection ring configuration in the downstream sense, the flow spreader and the cavity cease to conform in a tight tolerance mode and the flow is permitted to proceed in a less impeded manner around a splined downstream portion of the flow spreader which is extended axially of the flow and which is positioned within the outlet end of the central bore of the injecting apparatus to support the flow spreader within the enlarged cylindrical bore of the injection apparatus.

The mixer assembly downstream of the injection apparatus is preferably of either the static or dynamic type. The static type is exemplified by the melt blender manufactured by the *Koch Engineering Company, Inc.*, which melt blender is exemplified in U.S. Pat. Nos. 3,785,620 and 3,871,624. This mixer is fully described and illustrated in bulletin No. KMV-2 of Koch Engineering Company, Inc.

A dynamic mixer of a preferred type basically comprises a through-bore with a series of sets of axially spaced and fixed gear shaped teeth peripherally disposed in the bore with interspersed rotary mixing gears mounted on a common shaft in the bore. Rotation of the shaft provides mixing of molten extrudate flowing in the bore by the interaction of the fixed and rotary mixing teeth.

The dynamic cooler utilized downstream from the mixer is of the type generally exemplified in U.S. Pat. No. 3,830,901 of Thomas W. Winstead entitled *Continuous Process for Extruding Cellular Thermoplastics*, issued Aug. 20, 1974.

Such a cooler is essentially a flow metering device which includes a cooling function such that a predetermined quantity of molten extrudate per unit time and at a preselected extrusion temperature is delivered to the extrusion die. Foamed thermoplastic extrudate has been produced in the systems and by the methods of the present invention utilizing water alone as a blowing agent, water and nitrogen as a combined blowing agent and water and air as a blowing agent. To these combinations have been added talc as a nucleating agent, and azodicarbonamide as a chemical blowing agent in various combinations to produce foamed extrudate which after molding in a continuous system to form molded product have ranged in density from 2.3 lbs. per cu. ft. to 21.0 lbs. per cu. ft. Various attendant cell sizes have been readily achievable which are commensurate with the densities. Both oriented and non-oriented foams have been produced utilizing the blowing agents and techniques of the invention and have been found to be highly satisfactory.

The cell pressures achievable by the present invention are higher than the cell pressures achievable by Freon blowing agents and therefore, less brittleness is an immediate benefit achieved by the present invention in the ultimate extruded foam products. The oriented foams have been stretch oriented 1.5 times initial dimensions in both the machine and transverse directions of extrusion and this has been found to be highly satisfactory in producing foams of reduced brittleness and enhanced structural strength.

For flow rates of molten polystyrene extrudate on the order of fifty (50) lbs. per hour, water is introduced into the extruder barrel at 2000 –3800 PSIG; gas is introduced into the injector at a delivery pressure on the order of 3200–5000 PSIG at 430° F. and the extrudate is fed to the extrusion die at 260°–280° F. and 1300–3600 PSIG. All of these parameters are approximate but represent desired orders of magnitude in the process of the present invention to produce polystyrene foams of the densities referenced above.

BRIEF DESCRIPTION OF THE DRAWINGS

In the Drawings:

FIG. 5 is a schematic diagram of a preferred embodiment of a tandem extruder extrusion system of the present invention;

FIG. 6 is a schematic diagram of an alternate embodiment of a tandem extruder type system;

FIG. 7 is a schematic diagram of still another alternate embodiment tandem extruder type system;

FIG. 8A is a schematic diagram of still another alternate embodiment of a tandem extruder type system;

FIG. 8B is a schematic of a laboratory approximation of the system of FIG. 8A;

FIG. 9 is a schematic diagram of yet another alternate embodiment of a tandem extruder type system;

FIG. 11 is a front view of one half of the housing for the gas injector of the present invention;

FIG. 12 is a detailed cross section taken along line 12—12 of FIG. 11;

FIG. 14 is a cross-section taken along line 4—14 of FIG. 13;

DETAILED DESCRIPTION OF THE DRAWINGS

Figure 1:
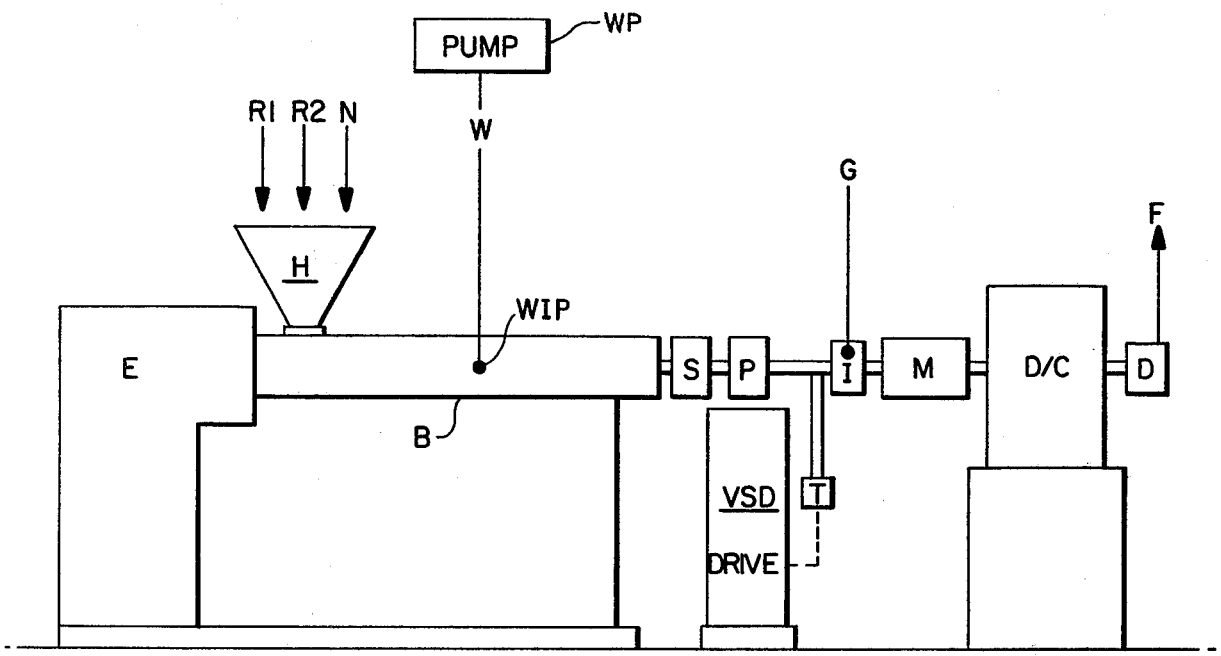
FIG. 1 is a schematic diagram of a preferred embodiment of a single extruder extrusion system of the present invention.

Referring in detail to the drawings and with particular reference to FIG. 1 a preferred embodiment of a single extrusion system for producing foamed thermoplastic resin is illustrated as including an extruder E having an elongated barrel B with an input hopper H positioned against the upstream end of the barrel B to receive resin R1, granular R2 and/or nucleating material N at that point of the extruder. The downstream or gate end of the barrel B exhausts through a screen changer S to a controlled rate gear pump P from which controllable quantities of extrudate are emitted.

Intermediate the upstream input hopper H and the screen changer S in the barrel B is a water injection point WIP which receives water W from a controlled volume water pump WP as schematically shown.

The controlled volume pump P is preferably a gear pump and has a variable speed drive VSD which is responsive to a control voltage from a pressurized voltage to voltage transducer T, the latter being connected to the input side of a gas injection assembly I which is connected to an external source of gas or air G as will be hereinafter more fully described. Basically, the transducer T senses the pressure at the input of the gas injector to determine whether or not there is a variation in pressure differential at that point caused by either a variation in flow of extrudate into the injector, flow of gas into the injector, or a combination of both.

The output of the gas injector, which at this point is a mixture of gas and molten extrudate is then passed through a mixer M which may be either of the static or dynamic type and thence through a dynamic cooler such as that described in U.S. Pat. No. 3,830,901 of Thomas W. Winstead, as above identified, from whence the thoroughly mixed and cooled extrudate with entrained water and gas is delivered to the outlet die D from which it is emitted in the form of foam sheeting F.

Not all of the methods of the present invention involve the use of water injection in which case, the water pump WP is simply disabled. However, in the case in which water is injected into the extruder E, a uniform flow of water W at the water injection point WIP is maintained by utilizing, for example, a constant displacement water pump WP in a preferred embodiment of the present invention.

Further, it has been established that uniform gas flow at the gas injection point within the injection apparatus is essential to product quality and, as indicated above, this uniformity of gas flow is achieved by maintaining a constant pressure differential between the source of gas G and the melt flow of the extrudate through the gas injection apparatus I by sensing this differential or pressure occurring at the mixing point within the gas injection apparatus I through the pressure/voltage transducer T which by varying its output voltage, controls the pumping rate of the pump P and thereby varies the melt flow through the gas injector I to achieve a constant pressure differential therein.

The water pump WP may be of a similar construction to pumps employed to inject fluorocarbons into the extruder as a blowing agent and in fact, this water injection can be accomplished at the same position on the extruder barrel B as was previously used to inject fluorocarbons therein. Water levels ranging from 0–8% by weight of the melt within the extruder are contemplated by the present invention. These range of water injection are accomplished in the 50 lb. per hour range, for example, by injection pressure ranging from 2000 to 3800 PSIG.

Figure 2:
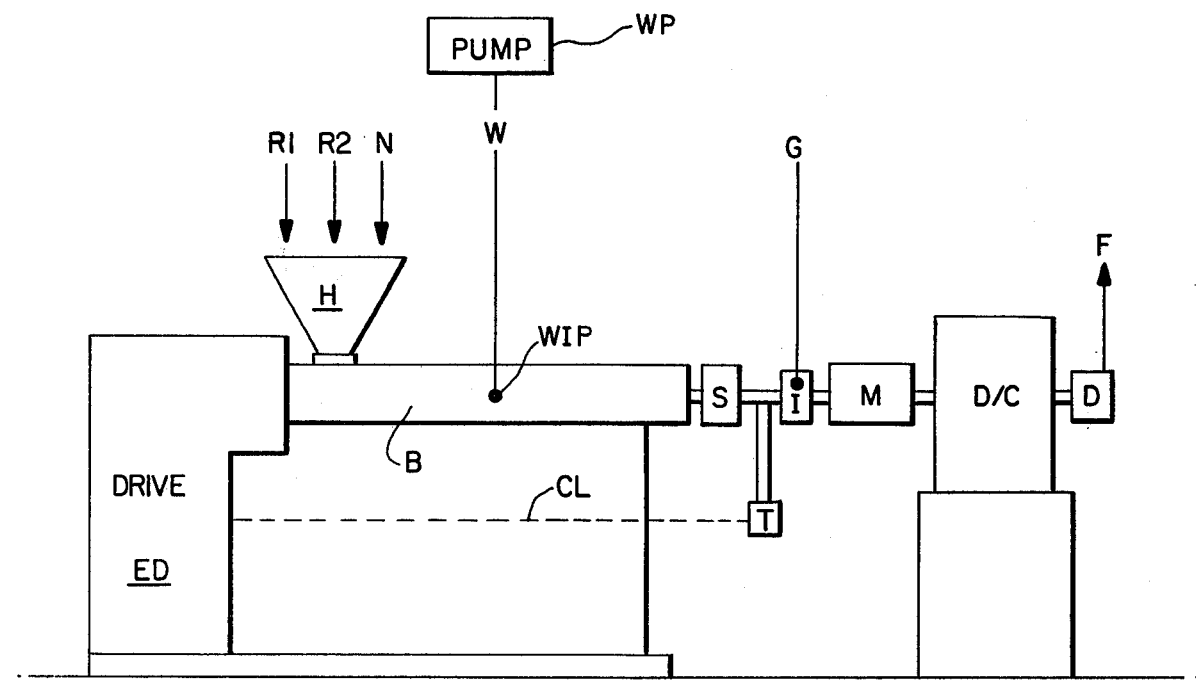
FIG. 2 is a schematic diagram of an alternate embodiment of the single extruder type.

Referring next to FIG. 2, wherein like components to FIG. 1 bear like designations, it can be seen that the transducer T has a control link CL indicated schematically by dotted lines going back to control the speed of the drive ED of the extruder E. In this embodiment, there is no gear pump P upstream of the gas injection apparatus I and therefore the pressure at the intake of the gas injection apparatus I is controlled by controlling the extruder drive rather than the speed of a gear pump immediately adjacent the injection apparatus I.

Figure 3:
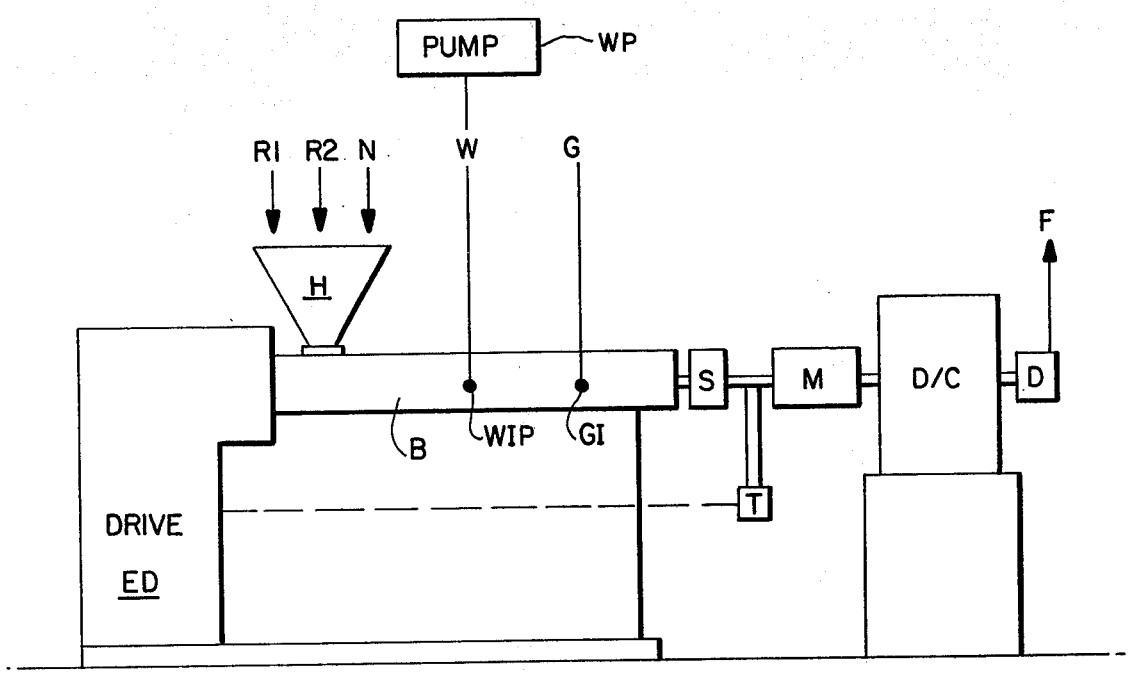
FIG. 3 is a schematic diagram of still another alternate embodiment of the single extruder type.

Referring next to FIG. 3, wherein like components to FIGS. 1 and 2 bear like designations, it can be seen that the gas injection apparatus I has been removed as well as the upstream gear pump P and that the gas G is directly introduced into a gas intake GI adjacent the downstream gate area of the barrel B of the extruder E.

Furthermore, between the screen changer S and the intake of the mixer M the transducer T is coupled to sense the upstream pressure entering the mixer and control the drive ED of the extruder E to vary its speed and control the upstream pressure at the inlet of the mixer M. The reflection of this pressure back into the downstream gate area of the extruder barrel B tends to maintain a constant pressure differential between the flow of molten extrudate and the gas G at the injection point GI in the extruder E.

Figure 4:
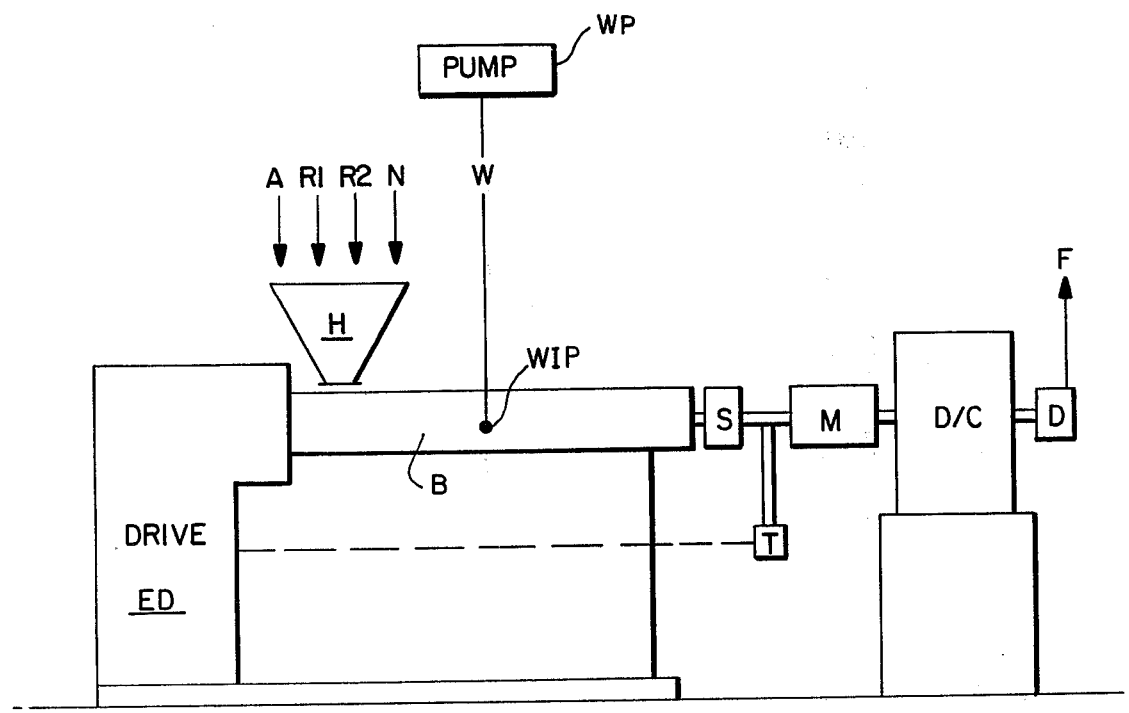
FIG. 4 is a schematic diagram of yet another embodiment of the single extruder type.

Referring next to FIG. 4, there is no gas injection and the embodiment illustrated therein is for reception of chemical blowing agent, preferably, azodicarbonamide, designated by the arrow A which is injected into the extruder barrel B at the hopper H. The extruder drive ED is controlled by the transducer T in the identical manner previously described for FIG. 3.

FIGS. 5, 6, 7, 8, and 9 are directed to tandem extruder systems in which the upstream extruder is designated E1 and the downstream extruder designated E2. Basically, the downstream extruder E2 replaces the dynamic cooler D/C of FIGS. 1–4. In all of the embodiments of FIGS. 5–9, the downstream extruder E2 feeds directly from its barrel B2 into the extruding die D to produce the desired thermoplastic foam extrudate.

In the embodiments of FIGS. 5–9, the components of a given extruder, where duplicated between the extruders E1 and E2 will bear like suffices.

In the embodiment of FIG. 5, there are two gear pumps P1 and P2 which are located immediately upstream and downstream, respectively, of the gas injection apparatus I. The upstream gear pump P1 has its drive DSD1 controlled as to speed by the output of the transducer T in the same manner described for the embodiment of FIG. 1. The downstream pump D2 is driven at a constant speed so that the extrudate melt which is being monitored as to pressure is controlled both upstream and downstream of the gas injection apparatus I by positive displacement gear pumps to compensate for any compression of the extrudate melt itself and thereby reduce the compressibility effects on the stability of the system at the point of gas injection. A mixer, either static or dynamic is illustrated as being immediately downstream from the downstream gear D2 from whence the extrudate melt with gas and water injected therein passes into the downstream extruder E2 through the barrel B2 of the latter and from that point directly to the output die D to produce the desired foam extrudate F.

Referring next to FIG. 6, the upstream gear pump P1 of FIG. 5 has been removed and the transducer T controls the drive ED1 of the upstream extruder E1 through a control linkage CL indicated in dotted lines to thereby provide the pressure differential control at the point of gas injection in a manner similar to that previously described for FIG. 2. In this embodiment, however, the downstream gear pump D2 remains to isolate the gas injection point from the downstream mixer M and downstream extruder E2, thereby preventing compressibility and instability present in the downstream extruder E2 from reflecting back to the gas injection point and the gas injection apparatus I. All of the elements of FIG. 6 which are like elements to those of FIG. 5 bear like designations.

Referring to FIG. 7, wherein like elements bear like designations to FIGS. 5 and 6, it can be seen that FIG. 7 is similar to FIG. 6 with the exception that the downstream mixer M has been removed from its position between the downstream gear pump D2 and the downstream extruder E2 and the gas ingestion point G1 has been placed adjacent the downstream gate area in the barrel B1 of the first or upstream extruder E1.

Referring next to FIG. 8A, it can be seen that this embodiment is similar to the embodiment of FIG. 7, with like elements thereto bearing like numerals with the exception that the downstream gear pump P2 has been removed and the transducer T is now connected between the screen changer S at the output of the upstream transducer E1 and the input of the downstream transducer E2.

Referring to FIG. 8B, this embodiment is a manually controlled laboratory approximation of the embodiment of FIG. 8A with a dynamic cooler D/C simulating the downstream extruder E2 of FIG. 8A. The control linkage CL is approximated by manual control of the extruder drive EDI.

Referring to FIG. 9, it can be seen that the system illustrated therein is identical to that of FIG. 8 with the exception that there is no gas injection point and only water W and chemical blowing agent A are introduced into the barrel B1 and the hopper H, respectively, of the extruder E1.

THE GAS INJECTOR ASSEMBLY

Figure 10:
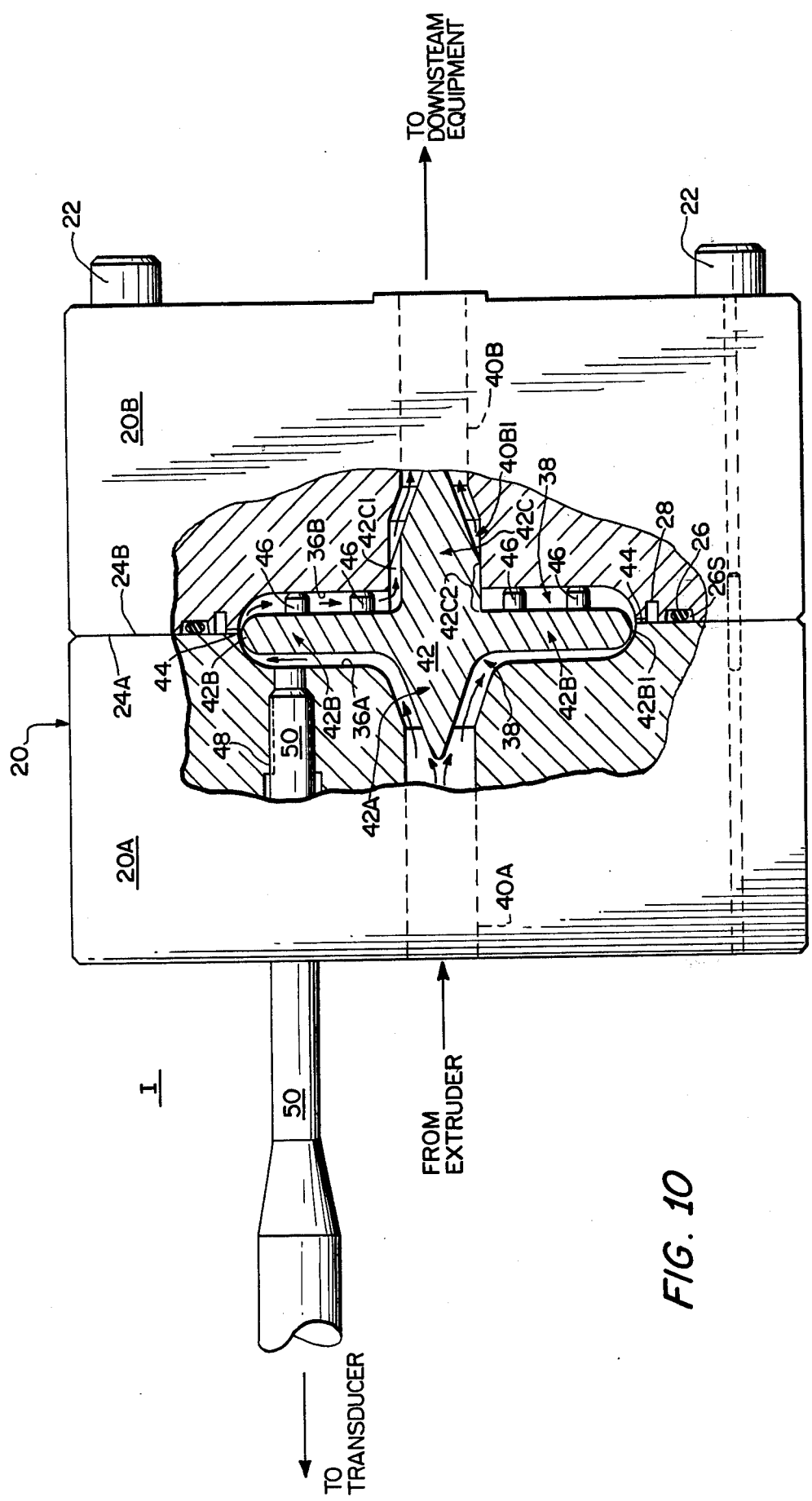
FIG. 10 is a side elevation and partial cross-section of a gas injector assembly of the present invention.

Referring now to FIGS. 10, 11 and 12, the gas injector assembly I is shown as having a body portion 20 comprised of an upstream half 20A and a downstream half 20B, which are coaxially bolted together by bolts 22 such that opposed surfaces 24A and 24B thereof are tightly clamped together. The surface 24B, illustrated in plain view in FIG. 11, is sandblasted to provide for the controlled leakage of gas under pressure through the junction formed by juxtaposing the said surfaces 24A and 24B. This gas leakage is confined to the interior most portion of the surfaces by providing an O-Ring 26 in an O-Ring slot 26S O-Ring 26 forms a seal about the juxtaposed surfaces 24A and 24B externally of an adjacent annular gas port 28 formed in and communicating through the downstream body portion 20B (FIG. 12) by means of a passageway 30 and an external hose connection 32 or the like to an air supply 34.

The juxtaposed surfaces 24A and 24B are annular in configuration and join centrally located dished surfaces 36A and 36B which are co-extensive and define a centrally located mixing cavity 38 within the housing 20 between the housing section 20A and 20B. The upstream half of the mixing cavity 38 communicates with an inlet port 40A and a downstream half of the mixing cavity 30A communicates with an outlet port 40B, the said inlet and outlet ports being respectively connected to the upstream and downstream conduits bearing the molten thermoplastic material in the system of the present invention.

The inlet and oulet portion 40A and 40B are coaxial and the outer extremities of the mixing chamber 38 are concentric with the common axis of the inlet and outlet ports 40A and 40B. Thus, the mixing chamber is circular in cross-section in a plane transverse of the axis of the inlet and outlet ports 40A and 40B and is basically rectangular with semi-circular ends in a cross-section taken along the common axis of the inlet and outlet ports 40A and 40B. This fact is clearly illustrated by FIGS. 10, 11 and 12.

FIG. 11, taken in conjunction with FIG. 10 illustrates a flow spreader 42 in place within the mixing chamber 38. This flow spreader 42 is in the form of an in-line slug having a centrally located upstream spreader cone 42A which merges with a disc shaped central portion 42B in a smooth transitional configuration which in turn merges at its downstream side with a fluted flow director cone and mounting means 42C. The flow directing cone and mounting means 42C includes flutes 42C1 which permit the exhausting of intermixed air and/or gas and thermoplastic from the mixing chamber 38 into the outlet port 40B in the downstream half 20B of the housing of the gas injector apparatus I. The flow ports or flutes 42C1 are milled or otherwise formed into the cylindrical base portion 42C2 of the flow directing and mounting means 42C, the outer extremity of the said base portion being in juxtaposition with the internal wall of an enlarged portion or lead in section 40B1 of the outlet port 40B. This securely mounts the flow diverting slug 42 coaxially with both the inlet port 40A, into which the upstream diverter cone 42A extends, and the downstream or outlet port 40B. The disc shaped central portion 22B of the flow spreader 42 has acurately configured outer extremities 42B1 which as clearly illustrated in FIG. 10 are very closely proximate to and slightly upstream from the annular line of engagement defined at the juncture of the dished surfaces 36A and 36B and their respective merger points with the sand blasted surface 24B. This annular junction line actually comprises an annular bleed-in or input 44 by which gas in a very thin film achieved by leakage from the gas inlet groove through the juncture 44 between the sandblasted surfaces 24B and the juxtaposed surface 24A provides a close approximation to a molecule for molecule injection of gas into a very thin film of flowing thermoplastic just downstream from the most proximate position of the flow diverter 42 and the dished surfaces of the mixing chamber 38.

Further, as illustrated in FIG. 10, a plurality of lag screws or other stud like shims 46 are provided on the downstream face of the central portion 42B of the flow diverter 42 in mutual juxtaposition therewith and with the downstream dished surface 36B of the mixing chamber 38 to properly space the flow diverter within the said mixing chamber.

Also, as illustrated in FIG. 10, the transducer probe for sensing the pressure at a point immediatey upstream from the gas injection juncture 44 is provided by a sensing port 48 in the upstream body portion 20A of the body 20 of the injector gas injector assembly I which leads from the upstream side thereof to a point immediately adjacent the closest proximate positions of the flow diverter 42 and the dished internal surface 36A of the mixing chamber 38. A transducer probe assembly 50 is inserted into the sensing port with suitable connections from the probe assembly 50 back to the transducer T thereby all the variations in pressure immediatey upstream from the gas and thermoplastic mixing position in the gas injection assembly I may be monitored.

In operation, molten extrudate is ingested through the inlet port 40A and diverted around the upstream diverter cone 42A of the flow diverter 42 from whence it is forced to flow as indicated by the flow arrows in FIG. 10 through an annular gap created by the symmetrical proximity of the outer most periphery 42B1 of the flow diverter 42 and the conformally shaped internal upstream surface 36A to present a thin annular film of molten thermoplastic to the annular gas injection junction 44 which provides, like-wise, a very thin sheet of gas to be intermixed with the very thin sheet of molten thermoplastic to provide an approximation of molecule for molecule intermix of these two materials and thence, the admixed thermoplastic and entrained gas proceeds around the shims or studs 46 and through the flutes 42C1 over the downstream directing cone 42C and out through the outlet port 40B to be further processed by the systems of the present invention downstream.

THE DYNAMIC MIXER STRUCTURE

Referring to FIGS. 13, 14, 15 and 16, a dynamic mixer DM of the present invention is shown as including a body portion 60 having a through-bore 62 and a right angle bore 64 communicating therewith at the upstream most end of the body portion 60 such that the right angle bore 64 comprises an inlet port into which thermoplastic melt received from the gas injection apparatus I is ingested.

Within the through-bore is mounted a dynamic mixer shaft assembly 66 which is sealed adjacent the right angle bore 64 by means of an O-ring seal 68 or the like to prevent leakage of ingested melt from the upstream end of the through-bore 62.

Externally of the through-bores 62 is a drive hub 66A on the shaft 66 for connection to any suitable external mode of power source shown schematically at 68. A dotted line connecting link 70 is also schematically indicated at the driving interconnection between the power source 68 and the drive hub 66A.

The dynamic mixer shaft 66 is provided with an auger feed section 66B positioned in the intersection or junction of the right angles 64 and the through-bore 62 such that molten extrudate received from the right angle bore 64 will be forced downstream in through-bore 62 by the auger section 66B upon rotation of the dynamic mixer shaft 66. The flow of molten thermoplastic material is illustrated by suitable flow arrows in the right angle port 64 and through port 62.

After traversing a smooth shank portion 66C of the mixer shaft 66 the melt or molten thermoplastic material encounters a series of spaced annular square tooth gear structures peripherally disposed in substantially uniformly spaced configuration along the mixing shaft 66 in the provision of a toothed section 66D. The basic configuration of each of these peripherally disposed gear structures 66D1 is illustrated in cross-section in FIG. 14 and in plan in FIG. 15.

Figure 13:
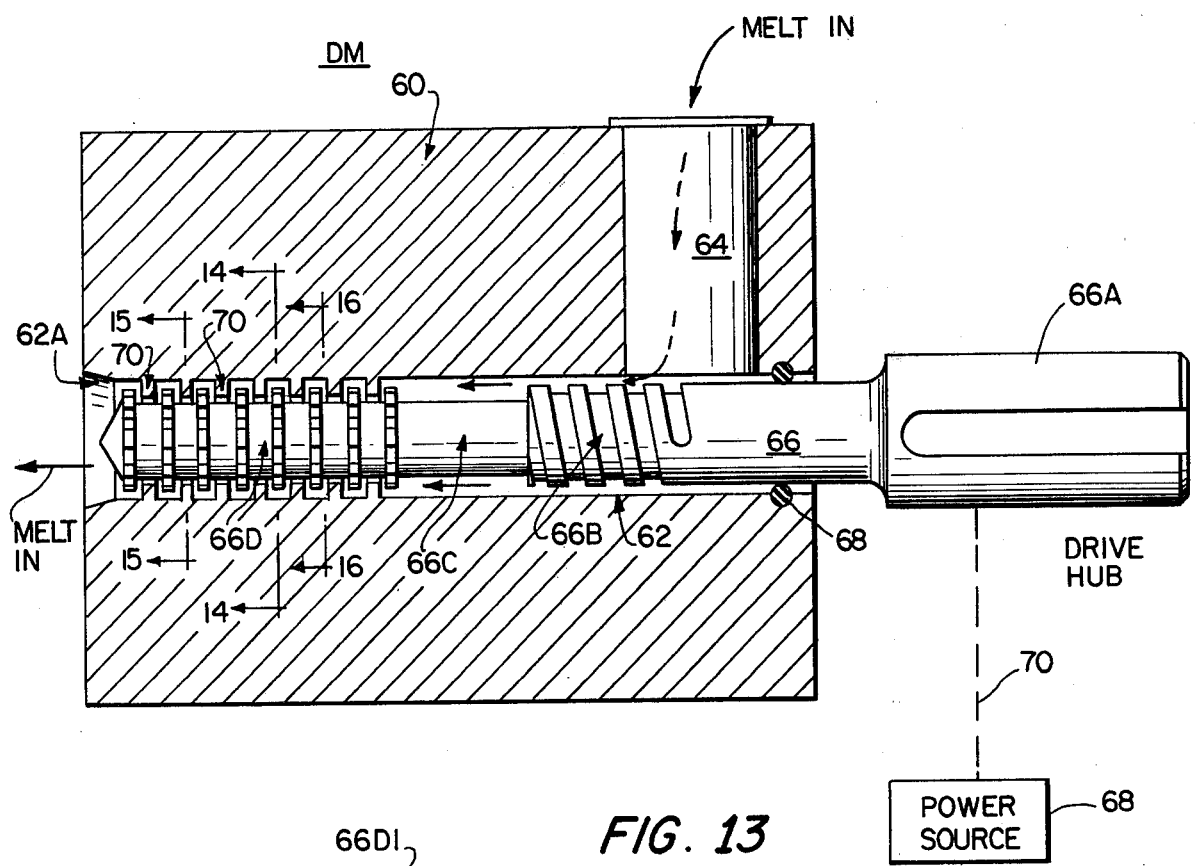
FIG. 13 is a schematic assembly diagram of a dynamic mixer configuration of the present invention.
Figure 14:
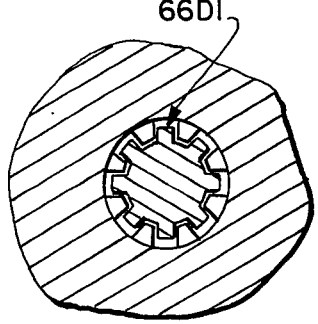
FIG. 14 is a side elevation of an internal shaft detail of the dynamic mixer of the present invention.
Figure 15:
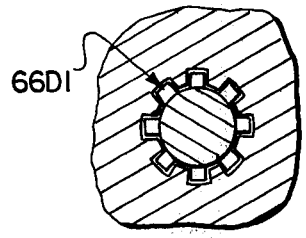
FIG. 15 is a cross-section taken along line 15—15 of FIG. 13.
Figure 16:
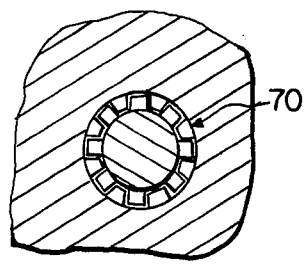
FIG. 16 is a cross-section taken along line 16—16 end view of the dynamic mixer of FIG. 13.

A like number of basically complimentary fixed and spaced gear piece configuration 70 disposed peripherally about the inner extremitites of the through-bore 62 in a coextensive array with the geared toothed section 66B of the mixer shaft 66 are provided as shown in a side section in FIG. 13 and in plan in FIG. 16 to interact with and be interspersed between each pair of adjacent gear structures 66D1 on the toothed section 66D of the mixer shaft 66. Rotation of the mixer shaft 66 causes the rotary teeth to churn and to homogenize the molten thermoplastic by interaction with the fixed gear piece 70 surrounding the inner periphery of the through-bore 62 such that discharged thermoplastic melt from the downstream end 62A of the through-bore 62 has been further homogenized by the action of the dynamic mixer DM. This mixer also further homogenizes the intermix gas and molten thermoplastic received from the gas injection assembly by as well as assuring uniformity of mix of other ingredients in the thermoplastic melt prior to delivery thereof to the downstream extrusion die D.

SPECIFIC EXAMPLES OF FOAMED THERMOPLASTIC PRODUCT

The operation of the systems of the present invention are best illustrated by the following specific examples of foamed thermoplastic product made in several of the preferred embodiments of these systems.

EXAMPLE A

Polystyrene resin of high molecular weight, high heat type such as Foster Grant's high-heat type 58DG is fed through an extruder system in the configuration of FIG. 1, such that a thermoplastic melt is provided at the extruder gate at a temperature on the order of 398° F. The pressure of the melt upstream of the extruder gate is 5500 PSIG and downstream is 5000 PSIG at a through-put of 44 lbs./hr. Water is injected into the extruder barrel and the melt by a constant displacement pump operating in a pressure range of 3100 to 3500 PSIG. A mixing action is imparted to the melt with entrained water downstream from the extruder at a temperature of 400° F. after which the melt is delivered through a controlled cooler to an extrusion die at 3500 PSIG and a temperature of 278° F. to form an extruded sheet of foamed thermoplastic material having a thickness of the order of 0.160 inches and density of 12.7 lbs./cubic foot.

EXAMPLE B

The resin of Example A with the addition of 4% talc by weight as a nucleant was run through an extruder system in the configuration of FIG. 1 and water injected by constant displacement pump at pressures in the range of 2900 to 3300 PSIG. A mixing action was imparted at 380° F. and controlled cooling effected to deliver the thermoplastic melt with entrained nucleant and water to an extrusion die at 3600 PSIG and a temperature of 283° F. The resultant extruder foamed thermoplastic sheet product of 0.190 inches thickness and a density of 8.9 lbs./cubic foot was left in flat sheets as well as thermoformed while still hot into the shape of meat trays.

EXAMPLES 1-20

The following table of examples defines products which have been made in extrusion systems configured as in FIGS. 1, 3, 4 and 8B. The appropriate figure number is indicated in the second column from the left hand side of the table. This table is provided to illustrate the versatility of the concepts of the present invention in producing foamed thermoplastics having a wide range of densities.

It should be recognized that the embodiments of FIG. 8B and those indicated in the following table as "similar to" FIGS. 3 and 4 are laboratory approximations of the embodiments of FIGS. 8A, 3 and 4, respectively. For example, in FIG. 8B, a dynamic cooler D/C is connected to simulate the second (downstream) extruder E2 of FIG. 8A and the upstream extruder E1 has its drive portion ED1 manually controlled to simulate the control function of the transduecer T and control link CL of the embodiment of FIG. 8A. Similar manually monitored and adjusted systems have been utilized under laboratory conditions to simulate the embodiments of FIGS. 3 and 4 in compiling the results illustrated in the following table:

EXAMPLES

| Example # | FIG. # | Resin HMWP [1] | Gas | Talc % | H$_2$O % | Gate Pressure PSI | Stock At Gate °F. | Through-put #/Hr. | Injection Pressure PSI | Injection Temp. °F. | Gas Pressure PSI | Mixer RPM | D/C Upstream Pressure PSI | D/C Downstream Pressure PSI | Stock At Die °F. | Density #/Ft.$^3$ |
|---|---|---|---|---|---|---|---|---|---|---|---|---|---|---|---|---|
| 1 | 1 | HMWP | CO$_2$ | 0.8 | 3.2 | 5300 | 410 | 60 | 4400 | 450 | 4500 | 750 | 3500 | 4000 | 300 | 2.65 |
| 2 | 1 | HMWP | CO$_2$ | 1.6 | 3.2 | 5300 | 410 | 60 | 4400 | 450 | 4500 | 750 | 3500 | 4000 | 300 | 2.65 |
| 3 | 1 | HMWP | CO$_2$ | 2.4 | 3.2 | 5300 | 410 | 60 | 4400 | 450 | 4500 | 750 | 3500 | 4000 | 300 | 2.65 |
| 4 | 1 | HMWP | CO$_2$ | 0 | 3.2 | 5300 | 410 | 60 | 4400 | 450 | 4500 | 750 | 3500 | 4000 | 300 | 2.65 |
| 5 | 1 | HMWP | CO$_2$ | 3.2 | 3.2 | 5300 | 410 | 60 | 4400 | 450 | 4500 | 750 | 3500 | 4000 | 300 | 2.65 |
| 6 | 1 | HMWP | N$_2$ | 0 | 3.45 | 5200 | 485 | 100 | 4200 | 475 | 5200 | 0 | 3100 | 3200 | 311 | 2.75 |
| 7 | 1 | HMWP | AIR | 0.4 | 3.3 | 5500 | 420 | 56 | 3400 | 450 | 3500 | 750 | 2300 | 4200 | 295 | 2.55 |
| 8 | 1 | HMWP | CO$_2$ | 2.4 | 2.35 | 5000 | 416 | 120 | 4800 | 450 | 4800 | 750 | 3800 | 3500 | 306 | 2.55 |
| 9 | 1 | HMWP | CO$_2$ | 2.4 | 1.0 | 5800 | 396 | 60 | 4000 | 460 | 4200 | 750 | 3100 | 4200 | 301 | 5.00 |
| 10 | 1 | HMWP | CO$_2$ | 3.2 | 3.2 | 5500 | 413 | 60 | 4400 | 450 | 4400 | 750 | 3500 | 4000 | 299 | 2.55 |
| 11 | 8B | HMWP | CO$_2$ | 2.4 | 2.3 | 5000 | 405 | 65 | N/A | N/A | 4400 | N/A | 3600 | 3600 | 302 | 2.50 |
| 12 | 8B | HMWP | AIR | 1.2 | 3.2 | 6000 | 378 | 65 | N/A | N/A | 4200 | N/A | 5600 | 3300 | 304 | 2.70 |
| 13 | 1 | HMWP | AIR | 1.6 | [2] | 6000 | 410 | 43 | 4200 | 400 | 4400 | 800 | 1600 | 2900 | 280 | 3.60 |
| 14 | 1 | HMWP | N$_2$ | 1.6 | [2] | 7500 | 408 | 42 | 4000 | 430 | 4200 | 800 | 1200 | 2900 | 282 | 4.00 |
| 15 | [3] | HMWP | AZO | 4.0 | [2] | 6300 | 406 | 46 | N/A | N/A | N/A | 0 | 1600 | 3100 | 288 | 3.76 |
| 16 | 1 | HMWP | AIR | 0 | [2] | 7200 | 410 | 44 | 4300 | 410 | 4400 | 0 | 1200 | 3100 | 278 | 3.70 |
| 17 | 1 | HMWP | N$_2$ | 0 | [2] | 7300 | 416 | 44 | 4100 | 425 | 4300 | 800 | 1500 | 3100 | 280 | 3.60 |
| 18 | [4] | HMWP | N/A | 1.6 | [2] | 6200 | 415 | 40 | N/A | N/A | N/A | 800 | 1000 | 3600 | 290 | 4.75 |
| 19 | [4] | HMWP | N/A | N/A | [2] | 5500 | 398 | 44 | N/A | N/A | N/A | 0 | 1200 | 3500 | 286 | 4.46 |
| 20 | 1 | HMWP | CO$_2$ | 0 | 0 | 5500 | 410 | 60 | 2600 | 450 | 4000 | 0 | 1300 | 3800 | 315 | 21.00 |

[1] High Molecular Weight Polystyrene
[2] Approximately 3.5-5.0%
[3] Similar To FIG. #4
[4] Similar To FIG. #3
N/A Not Applicable In the foregoing table, examples 11 and 12 deal with injection of gas directly into the extruder barrel at a given gas pressure and with no downstream mixer. Thus, the injection pressure, injection temperature and mixer RPM are not applicable (N/A) as indicated.

In the case of examples 15, 18 and 19 in the foregoing table the use of a chemical blowing agent or other than gas injection explains the presence of the N/A symbol.

It is to be understood that the Method and Apparatus For Generating Foamed Thermoplastic Materials disclosed herein may be modified as would obviously occur to one of ordinary skill in the art without departing from the spirit and scope to the present invention.

I claim:

1. The method of entraining gas as a blowing agent in a thermoplastic melt to provide foamed thermoplastic extrudate, comprising:
   providing an extruded flowing mass of thermoplastic melt; constraining the flow of said melt into a tubular configuration over a finite distance;
   impinging an annular sheet-like flow of gas under pressure on said tubular configuration of melt substantially transversely of the direction of flow thereof to entrain said gas in said melt;
   subsequently returning said melt with entrained gas to a flowing mass configuration;
   controlling the flow rate and temperature of said flowing mass with entrained gas to optimum values for subsequent extrusion; and
   extruding said flowing mass with entrained gas to produce said foamed thermoplastic extrudate 2. The method of claim 1, which further includes subjecting said flowing mass of melt and entrained gas to a mixing action immediately prior to controlling the flow rate and temperature thereof for ultimate extrusion.

3. The method of entraining water and gas as combined blowing agents in a thermoplastic melt to provide foamed thermoplastic extrudate comprising:
   introducing water into said thermoplastic melt upstream of the gate area of said extruder to provide, as an output of said extruder, an extruded flowing mass of thermoplastic melt with entrained water;
   constraining the flow of said melt into a tubular configuration over a finite distance;
   impinging an annular sheet-like flow of gas under pressure on said tubular configuration of melt substantially transversely of the direction of flow thereof to entrain said gas in said melt in addition to water;
   subsequently returning said melt with entrained gas and water to a flowing mass configuration;

controlling the flow rate and temperature of said flowing mass with entrained gas and water to optimum values for subsequent extrusion; and extruding said flowing mass with entrained gas and water to produce said foamed thermoplastic extrudate.

4. The method of claim 3, which further includes subjecting said flowing mass of melt and entrained gas to a mixing action immediately prior to controlling the flow rate and temperature thereof for ultimate extrusion.

5. The method of claims 3 or 4, wherein said water is introduced into said thermoplastic mass at a substantially uniform rate of flow.

6. The method of claims 1, 2, 3 or 4, wherein said gas and said flowing tubular configuration of thermoplastic are intermingled at a substantially constant pressure differential.

7. The method of claim 3 or 4, wherein said gas and said flowing tubular configuration of thermoplastic are intermingled at a substantially constant pressure differential; and wherein said water is introduced into said thermoplastic mass at a substantially uniform rate of flow.

8. The method of claim 1, 2, 3 or 4, wherein a nucleating agent is added to said thermoplastic melt prior to the addition of blowing agent thereto.

9. The method of claim 3 or 4 wherein a nucleating agent is added to said thermoplastic melt prior to the addition of blowing agent thereto; and wherein said water is introduced into said thermoplastic mass at a substantially uniform rate of flow.

10. The method of claim 1, 2, 3 or 4, wherein said gas and said flowing tubular configuration of thermoplastic are intermingled at a substantially constant pressure differential; and wherein a nucleating agent is added to said thermoplastic melt prior to the addition of blowing agent thereto.

11. The method of claim 3 or 4, wherein said gas and said flowing tubular configuration of thermoplastic are intermingled at a substantially constant pressure differential;

wherein said water is introduced into said thermoplastic mass at a substantially uniform rate of flow; and wherein a nucleating agent is added to said thermoplastic melt prior to the addition of blowing agent thereto.

12. The method of entraining water and gas as combined blowing agents in a thermoplastic melt to provide foamed thermoplastic extrudate, comprising:

generating a flowing thermoplastic melt in an extruder;

introducing a gas generating substance into said extruder for mixing therein with said flowing thermoplastic melt to entrain generated gas therein;

introducing water into said flowing thermoplastic melt upstream of the gate area of said extruder to provide, as an output of said extruder, an extruded flowing mass of thermoplastic melt with entrained water and gas;

subjecting said flowing thermoplastic melt with entrained water and gas to a mixing action downstream of said extruder;

subsequent to said mixing action, controlling the flow rate and temperature of said flowing mass with entrained gas and water to optimum values for subsequent extrusion; and extruding said flowing mass with entrained gas and water at said optimum values of flow rate and temperature to produce said foamed thermoplastic extrudate.

13. The method of claim 12, wherein said water is introduced into said thermoplastic mass at a substantially uniform rate of flow.

14. The method of claim 12 or 13, wherein said thermoplastic melt with entrained water and gas is subjected to said mixing action at a substantially constant pressure.

15. The method of claim 12 or 13, wherein said gas generating substance is azodicarbonamide.

16. The method of claim 12 or 13, wherein said thermoplastic melt with entrained water and gas is subjected to said mixing action at a substantially constant pressure; and wherein said gas generating substance is azodicarbonamide.

17. The method of claim 12 or 13, wherein a nucleating agent is added to said thermoplastic melt prior to the introduction of water thereto.

18. The method of claim 12 or 13, wherein a nucleating agent is added to said thermoplastic melt prior to the introduction of water thereto; and wherein said thermoplastic melt with entrained water and gas is subjected to said mixing action at a substantially constant pressure.

19. The method of claim 12 or 13, wherein a nucleating agent is added to said thermoplastic melt prior to the introduction of water thereto; and wherein said gas generating substance is azodicarbonamide.

20. The method of claim 12 or 13, wherein a nucleating agent is added to said thermoplastic melt prior to the introduction of water thereto;

wherein said thermoplastic melt with entrained water and gas is subjected to said mixing action at a substantially constant pressure; and wherein said gas generating substance is azodicarbonamide.

21. The method of continuously entraining water as a blowing agent in a thermoplastic melt to provide foamed thermoplastic extrudate comprising:

providing an extruded flowing mass of thermoplastic melt in an extruder;

introducing water into said thermoplastic melt upstream of the gate area of said extruder to provide, as an output of said extruder, an extruded flowing mass of thermoplastic melt with entrained water;

subjecting said thermoplastic melt with entrained water to a mixing action downstream of said extruder;

controlling the flow rate and temperature of said flowing mass with entrained water to optimum values for subsequent extrusion; and extruding said flowing mass with entrained water at said optimum values of flow rate and temperature to produce said foamed thermoplastic extrudate.

22. The method of claim 21, wherein said water is introduced into said thermoplastic mass at a substantially uniform rate of flow.

23. The method of claim 21, wherein gas is introduced into said thermoplastic mass subsequent to the entrainment of water therein and prior to said mixing action.

24. The method of claim 23, wherein said gas is introduced into said thermoplastic mass at a substantially constant pressure and wherein said water is introduced into said thermoplastic mass at a substantially uniform rate of flow.

25. The method of claim 21, 22, 23, or 24 wherein said thermoplastic melt with entrained water is subjected to said mixing action at a substantially constant pressure.

26. The method of claim 21, 22, 23, or 24 wherein said theromplastic mass in said extruder includes a nucleating agent entrained therein prior to the introduction of water thereto.

27. The method of claim 21, 22, 23, or 24 wherein said thermoplastic melt with entrained water is subjected to said mixing action at a substantially constant pressure; and wherein said thermoplastic mass in said extruder includes a nucleating agent entrained therein prior to the introduction of water thereto.

28. The method of entraining gas as a blowing agent in a thermoplastic melt to provide foamed thermoplastic extrudate, comprising: providing an extruded flowing mass of thermoplastic melt;

constraining the flow of said melt into a thin tubular configuration over a finite distance;

impinging an annular sheet-like flow of gas under pressure on said tubular configuration of melt to entrain gas in said melt;

subsequently returning said melt with entrained gas to a flowing mass configuration; and extruding said flowing mass with entrained gas to produce said foamed thermoplastic extrudate.

29. The method of claim 28, wherein said thermoplastic melt is polystyrene.

30. The method of claim 29, wherein said gas is air, nitrogen, carbon dioxide or water vapor.

31. Means for entraining gases and water as blowing agents in a thermoplastic melt to provide a foamed thermoplastic end product, comprising:

extruder means for providing a flowing mass of thermoplastic melt;

water injection means on said extruder means for injecting water at a substantially constant rate onto said flowing mass of thermoplastic melt to entrain a preselected amount of water therein;

gas injection means downstream of said water injection means for injecting gas into said flowing thermoplastic melt with water entrained therein at a preselected injection pressure;

first control means for using and maintaining a substantially constant pressure in said thermoplastic melt at the point of injection of said gas therein to maintain a substantially constant pressure differential at said point of injection of said gas; and second control means for controlling the flow rate and temperature of said flowing thermoplastic melt subsequent to the entrainment of water and gas therein and delivering said thermoplastic melt so controlled to an extrusion die to ultimately produce said foamed thermoplastic end product.

32. The invention of claim 31, which further includes mixing means downstream of said gas injection means and said extruder means for imparting a mixing action to said thermoplastic melt with said water and gas entrained therein.

33. The invention of claim 32, wherein said mixing means comprises a static mixing device.

34. The invention of claim 22, wherein said mixing means comprises a dynamic mixing device.

35. The invention of claim 32, wherein said gas injection means is downstream of said extruder means; and wherein said first control means comprises: transducer means for sensing pressure in said thermoplastic melt at the upstream side of said gas injection means and generating a control signal representative of said pressure; variable displacement pump means intermediate said extruder means and said gas injection means for delivering said thermoplastic melt with entrained water to said gas injection means; and variable speed drive means for said pump means, responsive to said control signal from said transducer means, for providing a drive speed of said variable displacement pump means commensurate with said substantially constant pressure to be maintained at said point of injection of gas in said thermoplastic melt.

36. The invention of claim 32, which further includes second variable displacement pump means intermediate said gas injection means and said mixing means for controlling the flow rate and pressure at which said thermoplastic melt with entrained water and gas is delivered to said mixing means.

37. The invention of claim 36, wherein said second control means comprises an additional extruder means.

38. The invention of claim 32, wherein said gas injection means is downstream of said extruder means; and wherein said first control means comprises:

transducer means for sensing pressure in said thermoplastic melt at the upstream side of said gas injection means and generating a control signal representative of said pressure; and variable speed drive means for said extruder means, responsive to said control signal for providing a drive speed of said extruder means commensurate with said substantially constant pressure to be maintained at said point of injection of gas in said thermoplastic melt.

39. The invention of claim 38, wherein said second control means comprises an additional extruder means.

40. The invention of claim 38 or 39 which includes variable displacement pump means intermediate said gas injection means and said mixing means for controlling the flow rate and pressure at which said thermoplastic melt with entrained water and gas is delivered to said mixing means.

41. The invention of claim 31, wherein said gas injection means is located on said extruder means; and wherein said first control means comprises:

transducer means for sensing pressure in said thermoplastic melt at the downstream end of said extruder means as a measure of the stability of said pressure at said point of gas injection and generating a control signal representative of variations in said pressure; and variable speed drive means for said extruder means, responsive to said control signal for providing a drive speed of said extruder means to maintain a substantially constant pressure in said thermoplastic melt at said point of gas injection.

42. The invention of claim 41, which further includes mixing means downstream of said gas injection means and said extruder means for imparting a mixing action to said thermoplastic melt with said water and gas entrained therein.

43. The invention of claim 41, wherein said second control means further comprises mixing means for imparting a mixing action to said thermoplastic melt with said water and gas entrained therein.

44. Means for entraining gases and water as blowing agents in a thermoplastic melt to provide a foamed thermoplastic end product, comprising:

extruder means for providing a flowing mass of thermoplastic melt with a preselected amount of gas generating reagent entrained therein;

water injection means on said extruder means for injecting water at a substantially constant rate into said flowing mass of thermoplastic melt to entrain a preselected amount of water therein;

first control means for sensing and maintaining a substantially constant pressure in said flowing thermoplastic melt downstream of said extruder means; and second control means including mixing means for imparting a mixing action to said flowing thermoplastic melt with water and gas entrained therein, controlling the flow rate and temperature thereof and delivering said thermoplastic melt to an extrusion die to ultimately produce said foamed thermoplastic end product.

45. The invention of claim 44, wherein said second control means comprises an additional extruder means.

46. Means for entraining gas as a blowing agent in a flowing mass of thermoplastic melt, comprising:

body means having substantially aligned inlet and outlet ports and an enlarged central cavity connecting same defined therein for conveying a flow of thermoplastic melt therethrough;

flow diverting means in said enlarged central cavity for converting a flow of thermoplastic melt from a flowing mass in said inlet port into a flowing tubular configuration over a finite distance in said cavity and back to a flowing mass in said outlet port; and injection means for impinging an annular stream of gas on said flowing tubular configuration transverse to the direction of flow thereof to entrain said gas in said thermoplastic melt.

47. The invention of claim 46, wherein said injection means comprises first and second juxtaposed body halves;

annular gas port means for conveying gas under pressure defined in opposed mating surfaces of said body halves around said central cavity defined therein; and said opposed mating surfaces being sand blasted between said annular gas port means and the periphery of said central cavity adjacent said flow diverting means providing an annular bleed vent for conveying said gas under pressure from said annular gas port means to impinge upon said flowing tubular configuration of said thermoplastic melt.

48. A device for entraining gas as a blowing agent in a flowing mass of thermoplastic melt, comprising:

body means having an inlet and an outlet port and an enlarged central cavity connecting said inlet and outlet ports for conveying a flow of thermoplastic melt therethrough;

flow diverting means in said enlarged central cavity for converting a flow of thermoplastic melt from a flowing mass in said inlet port into a flowing thin tubular configuration over a finite distance in said cavity and back to a flowing mass in said outlet port; and injection means for impinging a thin annular stream of gas on said flowing tubular configuration to entrain said gas in said thermoplastic melt.

49. The device of claim 48, wherein said injection means includes annular gas port means adjacent to said injection means and an annular bleed vent for conveying said gas under pressure from said annular gas port means to impinge upon said flowing tubular configuration.

* * * * *